US 11,464,327 B2

(12) United States Patent
Smith

(10) Patent No.: US 11,464,327 B2
(45) Date of Patent: Oct. 11, 2022

(54) MEDIA ARTICLE SUPPORT DEVICE

(71) Applicant: Bionca Smith, Dallas, GA (US)

(72) Inventor: Bionca Smith, Dallas, GA (US)

(*) Notice: Subject to any disclaimer, the term of this patent is extended or adjusted under 35 U.S.C. 154(b) by 0 days.

(21) Appl. No.: 17/087,726

(22) Filed: Nov. 3, 2020

(65) Prior Publication Data

US 2022/0133032 A1 May 5, 2022

(51) Int. Cl.
| *A47B 23/02* | (2006.01) |
| *F16M 11/14* | (2006.01) |
| *F16M 11/04* | (2006.01) |
| *F16B 2/06* | (2006.01) |
| *A47B 23/00* | (2006.01) |
| *F16B 2/08* | (2006.01) |

(52) U.S. Cl.
CPC .......... *A47B 23/025* (2013.01); *A47B 23/007* (2013.01); *F16B 2/065* (2013.01); *F16B 2/08* (2013.01); *F16M 11/046* (2013.01); *F16M 11/14* (2013.01); *A47B 23/00* (2013.01); *A47B 23/02* (2013.01)

(58) Field of Classification Search
CPC ..... A47B 23/025; A47B 23/007; A47B 23/00; F16B 2/065; F16B 2/08; F16M 11/046; F16M 11/14
See application file for complete search history.

(56) References Cited

U.S. PATENT DOCUMENTS

| 1,692,337 | A | * | 11/1928 | Forbes | A47B 23/007 |
| | | | | | 248/445 |
| 2,015,280 | A | | 9/1935 | Morishita | |
| 2,828,577 | A | * | 4/1958 | Anderson | A47B 23/007 |
| | | | | | 248/445 |
| 2,896,364 | A | | 7/1959 | McCollister | |
| 3,514,066 | A | * | 5/1970 | Singleton et al. | A47B 23/02 |
| | | | | | 248/445 |
| 3,827,222 | A | | 8/1974 | Toti | |
| 3,889,914 | A | * | 6/1975 | Torme | A47B 23/007 |
| | | | | | 248/445 |
| 4,294,425 | A | | 10/1981 | Weber | |
| 4,702,453 | A | * | 10/1987 | Bishop | A47B 23/06 |
| | | | | | 248/447.2 |
| 5,709,365 | A | * | 1/1998 | Howard | A47B 23/025 |
| | | | | | 248/447.2 |
| D566,987 | S | | 4/2008 | Harrison | |
| 9,167,192 | B2 | * | 10/2015 | Eoh | H04N 5/46 |
| 9,737,136 | B1 | | 8/2017 | Toland | |

FOREIGN PATENT DOCUMENTS

WO WO03103448 12/2003

* cited by examiner

*Primary Examiner* — Tan Le

(57) ABSTRACT

A media article support device for use by a user positioned in a bed includes a first rod, a coupler, and a clamping unit. The coupler is engaged to a first end of the first rod and can engage a bedrail of a bed or a surface above the bed. The clamping unit is engaged to a second end of the first rod and can selectively engage a media article, such as a book, electronic device, and the like. The coupler engages the bedrail of the bed or the surface above the bed so that the clamping unit is positionable proximate to a head of a user lying or sitting in the bed. The media article engaged to the clamping unit is positioned to be viewed by the user.

7 Claims, 5 Drawing Sheets

MEDIA ARTICLE SUPPORT DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to support devices and more particularly pertains to a new support device for use by a user positioned in a bed.

(2) Description of Related Art Including Information Disclosed Under 37 CFR 1.97 and 1.98

The prior art relates to support devices. Prior art support devices may comprise support devices attachable to, or positionable upon, beds for supporting books or items used in treatment of patients. Prior art support devices also may comprise support devices attachable to ceilings and books for presenting a book to a supine reader, as well as suction cups configured for attaching hanging units to windows, with the hanging unit being configured to engage an electronic device. What is lacking in the prior art is a support device engageable to a bedrail comprising a clamping unit rotatably attached to an arm so that a media article held by the clamping unit can be positioned for viewing in both supine and upright positions.

BRIEF SUMMARY OF THE INVENTION

An embodiment of the disclosure meets the needs presented above by generally comprising a first rod, a coupler, and a clamping unit. The coupler is engaged to a first end of the first rod and is configured to engage a bedrail of a bed or a surface above the bed. The clamping unit is engaged to a second end of the first rod and is configured to selectively engage a media article, such as a book, electronic device, and the like. The coupler is configured to engage the bedrail of the bed or the surface above the bed so that the clamping unit is positionable proximate to a head of a user lying or sitting in the bed. The clamping unit is configured to engage the media article so that the media article is positioned to be viewed by the user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
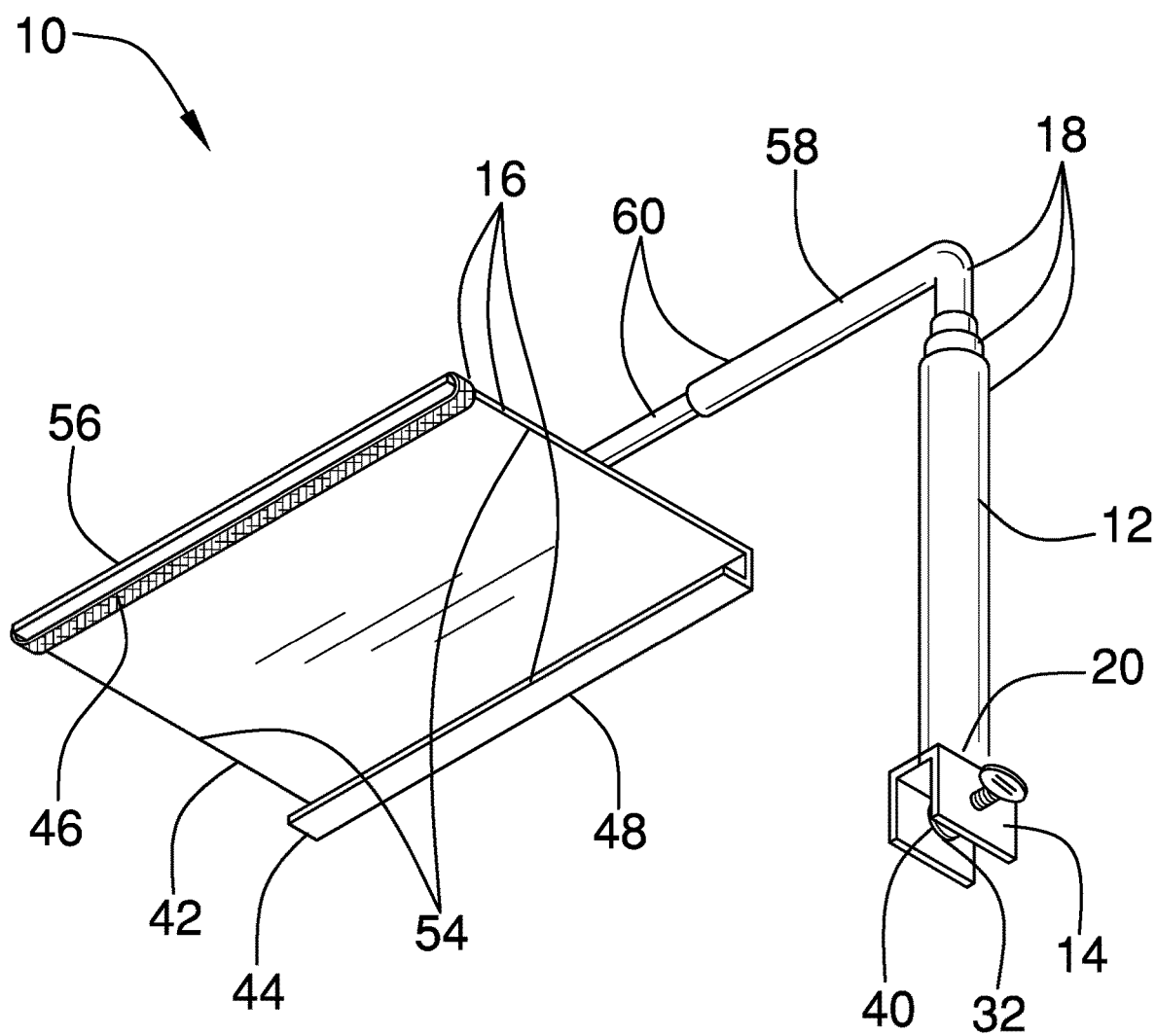
FIG. 1 is a bottom isometric perspective view of a media article support device according to an embodiment of the disclosure.

With reference now to the drawings, and in particular to FIGS. 1 through 5 thereof, a new support device embodying the principles and concepts of an embodiment of the disclosure and generally designated by the reference numeral 10 will be described.

As best illustrated in FIGS. 1 through 5, the media article support device 10 generally comprises a first rod 12, a coupler 14, and a clamping unit 16. The first rod 12 comprises a plurality of nested sections 18 so that the first rod 12 is selectively extensible. The coupler 14 is engaged to a first end 20 of the first rod 12 and is configured to engage a bedrail 22 of a bed 24 or a surface above the bed 24, such as a ceiling.

Figure 5:
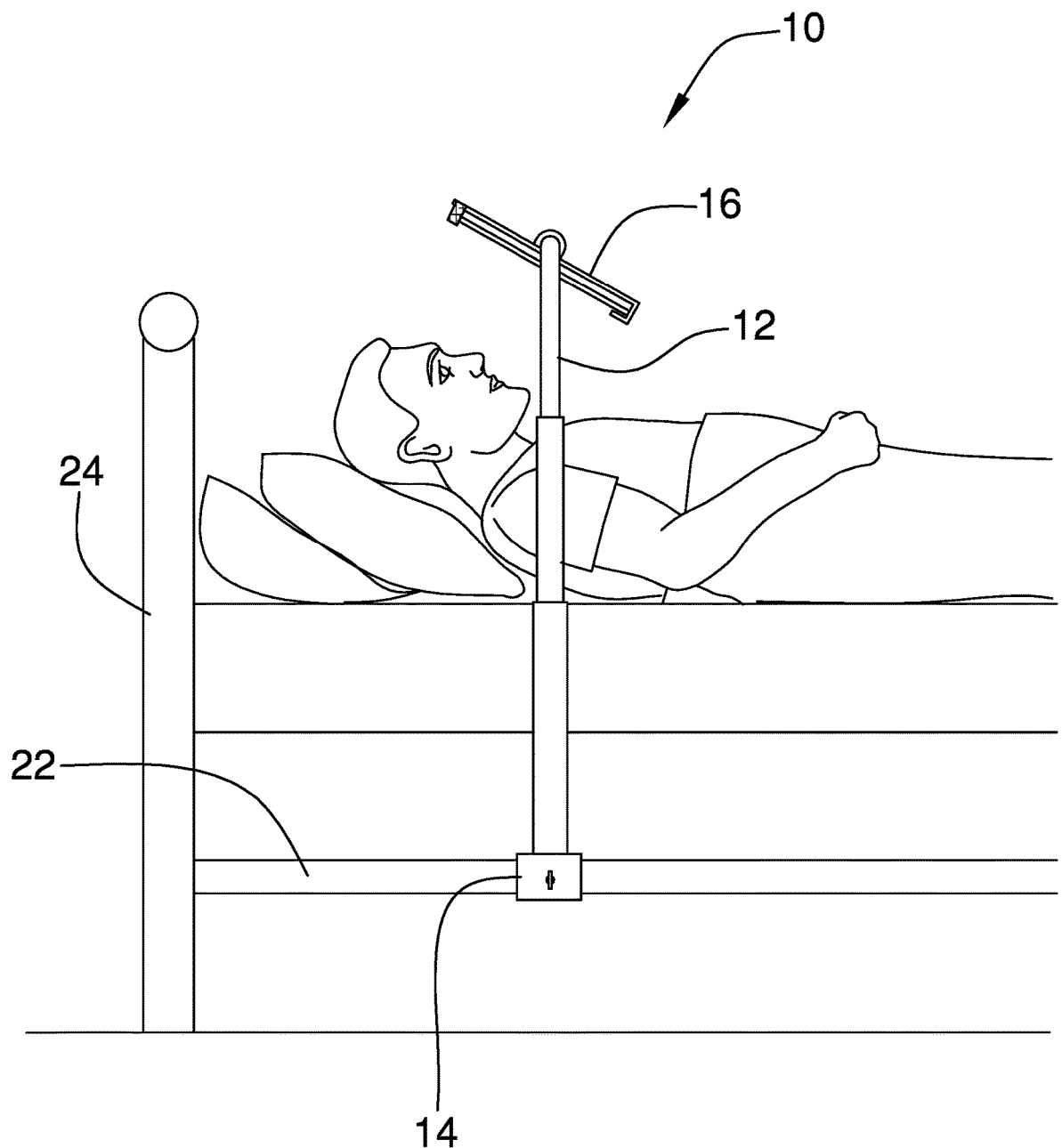
FIG. 5 is an in-use view of an embodiment of the disclosure.

The clamping unit 16 is engaged to a second end 26 of the first rod 12 and is configured to selectively engage a media article, such as a book, electronic device, and the like. The coupler 14 is configured to engage the bedrail 22 of the bed 24 or the surface above the bed 24 so that the clamping unit 16 is positionable proximate to a head of a user lying, as shown in FIG. 5, or sitting in the bed 24. The clamping unit 16 is configured to engage the media article so that the media article is positioned to be viewed by the user.

Figure 2:
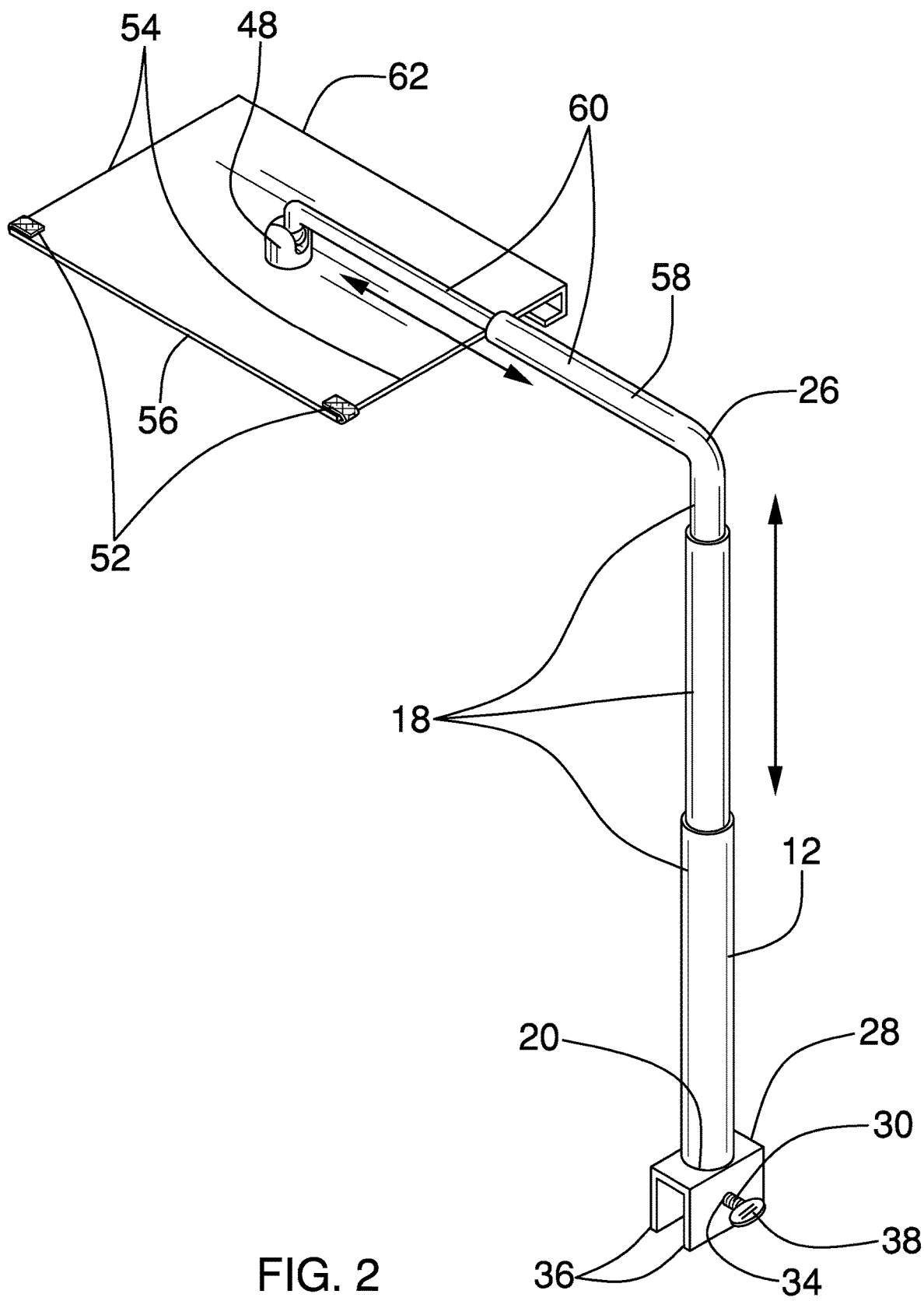
FIG. 2 is a front isometric perspective view of an embodiment of the disclosure.
Figure 3:
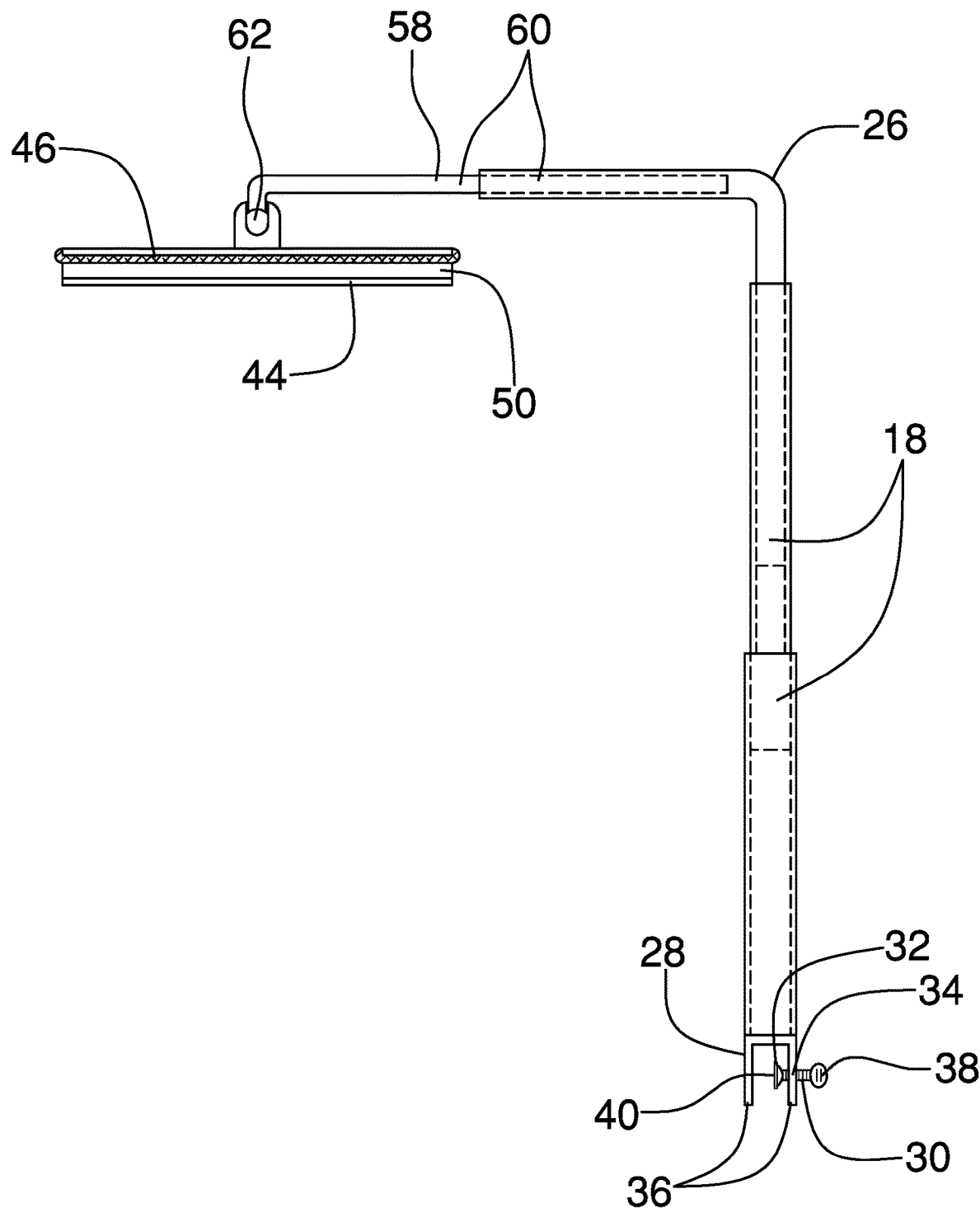
FIG. 3 is a front view of an embodiment of the disclosure.

The coupler 14 comprises a U-bracket 28, a thumbscrew 30, and a disc 32, as shown in FIG. 2. The U-bracket 28 has a hole 34 positioned in a respective arm 36 of a pair of arms 36 thereof. The thumbscrew 30 is threadedly positioned in the hole 34 so that a head 38 of the thumbscrew 30 is configured to turn the thumbscrew 30 to attach the U-bracket 28 to a bedrail 22 positioned therebetween. The disc 32 is rotationally engaged to a terminus 40 of the thumbscrew 30 distal, from the head 38, and is configured to engage the bedrail 22 so that the thumbscrew 30 does not penetrate thereinto.

The clamping unit 16 comprises a panel 42, a lip 44, and a strap 46, as shown in FIG. 1. The lip 44 is engaged to and extends from a bottom 48 of the panel 42. The lip 44 is L-shaped so that the lip 44 and the panel 42 define a slot 50, which is configured for insertion of a first edge of the media article.

The strap 46 has opposed ends 52, each of which is engaged to a respective opposed side 54 of the panel 42 proximate to a top 56 thereof. The strap 46 and the panel 42 are configured for insertion therebetween of a second edge of the media article so that the media article is engaged to the panel 42. The strap 46 is resiliently stretchable and may comprise elastic, or other resilient material, such as, but not limited to, rubber, silicone, and the like.

A second rod 58 is engaged to and extends between the first rod 12 and the clamping unit 16. The second rod 58 extends substantially perpendicularly from the first rod 12 so that the second rod 58 positions the clamping unit 16 over the user. The second rod 58 comprises a plurality of nested segments 60 so that the second rod 58 is selectively extensible.

Figure 4:
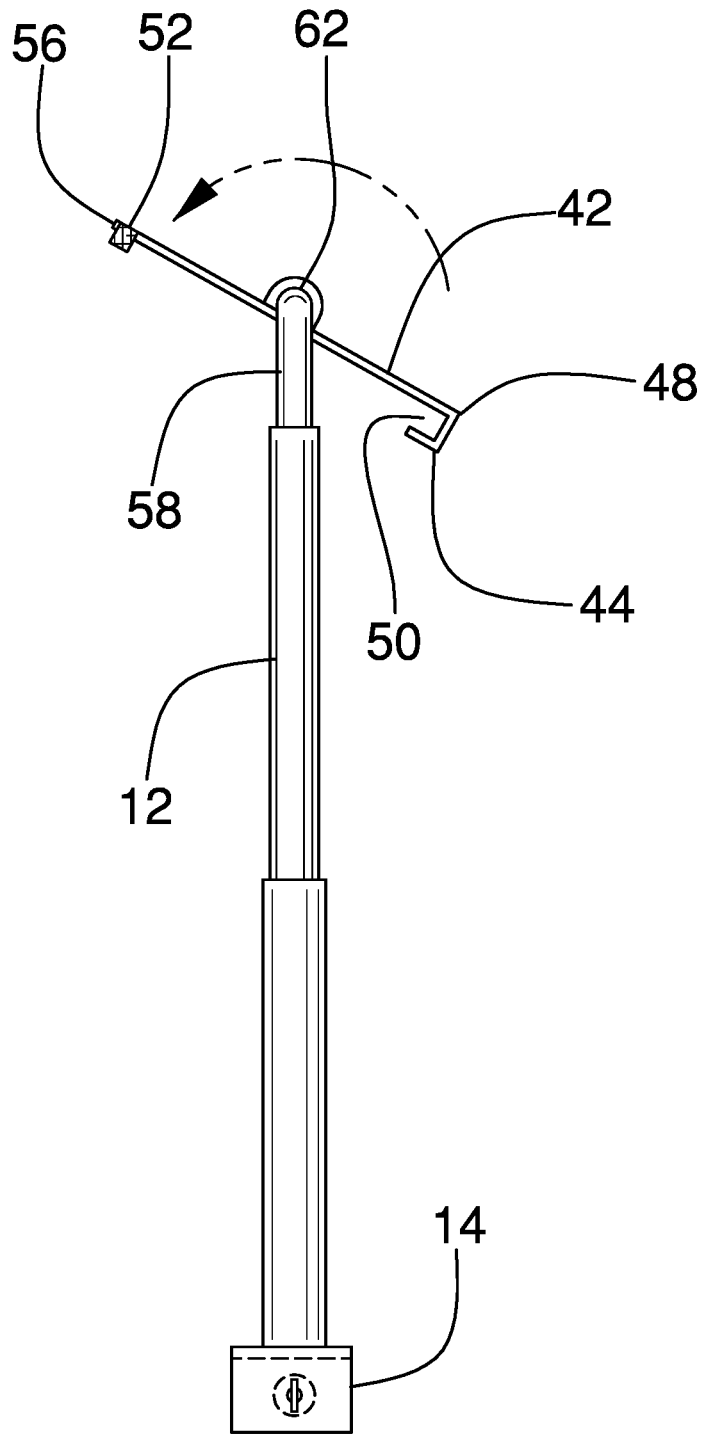
FIG. 4 is an end view of an embodiment of the disclosure.

A ball joint 62 is engaged to and is positioned between the second rod 58 and the clamping unit 16 so that the clamping unit 16 is rotatable relative to the second rod 58, as shown in FIG. 4. With the first rod 12 and the second rod 58 being selectively extensible and the panel 42 being rotatable relative to the second rod 58, the user can maneuver the device 10 into a configuration that allows the user to comfortably view the media article.

In use, the first rod 12 is engaged to the bedrail 22 by positioning the U-bracket 28 over the bedrail 22 and tightening the thumbscrew 30. The first rod 12 and the second rod 58 are extended as desired by the user to achieve a configuration that allows the user to comfortably view a media article held by the clamping unit 16. The media article is inserted by its first edge into the slot 50. The strap 46 is stretched and the second edge of the media article is inserted between the strap 46 and the panel 42. Releasing the strap 46 causes is to rebound and to engage the media article to the panel 42.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A media article support device comprising:
a first rod;
a coupler engaged to a first end of the first rod and being configured for engaging a bedrail of a bed or a surface above the bed;
a clamping unit engaged to a second end of the first rod and being configured for selectively engaging a media article, wherein the coupler is configured for engaging the bedrail of the bed or the surface above the bed such that the clamping unit is positionable proximate to a head of a user lying or sitting in the bed, wherein the clamping unit is configured for engaging the media article such that the media article is positioned for viewing by the user;
wherein the coupler comprises:
a U-bracket having a hole positioned in a respective arm of a pair of arms thereof,
a thumbscrew threadedly positioned in the hole, wherein a head of the thumbscrew is configured for turning the thumbscrew for attaching the U-bracket to a bedrail positioned therebetween, and
a disc rotationally engaged to a terminus of the thumbscrew distal from the head, wherein the disc is configured engaging the bedrail such that the thumbscrew does not penetrate thereinto;
a second rod engaged to and extending between the first rod and the clamping unit, the second rod extending substantially perpendicularly from the first rod, such that the second rod positions the clamping unit over the user; and
a ball joint engaged to and positioned between the second rod and the clamping unit, such that the clamping unit is rotatable relative to the second rod.

2. The media article support device of claim 1, wherein the first rod comprises a plurality of nested sections such that the first rod is selectively extensible.

3. The media article support device of claim 1,
wherein the clamping unit comprises:
a panel;
a lip engaged to and extending from a bottom of the panel, the lip being L-shaped such that the lip and the panel define a slot, wherein the slot is configured for insertion of a first edge of the media article; and
a strap having opposed ends, each opposed end being engaged to a respective opposed side of the panel proximate to a top thereof, wherein the strap and the panel are configured for insertion therebetween of a second edge of the media article, such that the media article is engaged to the panel.

4. The media article support device of claim 3, wherein the strap is resiliently stretchable.

5. The media article support device of claim 4, wherein the strap comprises elastic.

6. The media article support device of claim 1, wherein the second rod comprises a plurality of nested segments such that the second rod is selectively extensible.

7. A media article support device comprising:
a first rod, the first rod comprising a plurality of nested sections such that the first rod is selectively extensible;
a coupler engaged to a first end of the first rod and being configured for engaging a bedrail of a bed or a surface above the bed, the coupler comprising:
a U-bracket having a hole positioned in a respective arm of a pair of arms thereof,
a thumbscrew threadedly positioned in the hole, wherein a head of the thumbscrew is configured for turning the thumbscrew for attaching the U-bracket to a bedrail positioned therebetween, and a disc rotationally engaged to a terminus of the thumbscrew distal from the head, wherein the disc is configured engaging the bedrail such that the thumbscrew does not penetrate thereinto;

a clamping unit engaged to a second end of the first rod and being configured for selectively engaging a media article, wherein the coupler is configured for engaging the bedrail of the bed or the surface above the bed such that the clamping unit is positionable proximate to a head of a user lying or sitting in the bed, wherein the clamping unit is configured for engaging the media article such that the media article is positioned for viewing by the user, the clamping unit comprising:

a panel, a lip engaged to and extending from a bottom of the panel, the lip being L-shaped such that the lip and the panel define a slot, wherein the slot is configured for insertion of a first edge of the media article, and a strap having opposed ends, each opposed end being engaged to a respective opposed side of the panel proximate to a top thereof, wherein the strap and the panel are configured for insertion therebetween of a second edge of the media article, such that the media article is engaged to the panel, the strap being resiliently stretchable, the strap comprising elastic;

a second rod engaged to and extending between the first rod and the clamping unit, the second rod extending substantially perpendicularly from the first rod, such that the second rod positions the clamping unit over the user, the second rod comprising a plurality of nested segments such that the second rod is selectively extensible; and a ball joint engaged to and positioned between the second rod and the clamping unit, such that the clamping unit is rotatable relative to the second rod.

* * * * *